July 30, 1935.　　　　C. U. PARKER　　　　2,009,588

WINDSHIELD WIPER

Filed April 6, 1931

INVENTOR.

Corray U. Parker,

BY F. Lewis Peyton
ATTORNEY

Patented July 30, 1935

2,009,588

UNITED STATES PATENT OFFICE 2,009,588

WINDSHIELD WIPER

Corray U. Parker, Jackson, Miss.

Application April 6, 1931, Serial No. 528,086

1 Claim. (Cl. 15—255)

My invention relates to electric windshield wipers particularly to that type in which an electric motor produces the driving power.

One important object of my invention is to provide a device of the character described, which is adaptable to use on street-cars and similar vehicles.

Another object of my invention is to provide a device of the character described which has appended a flexible wiper automatically adjustable in its sweep to the angle of the window across which it travels.

The invention also embodies other features of construction, arrangement and operative association of parts, one embodiment of which is disclosed in the accompanying drawing.

In the drawing

Figure 1:
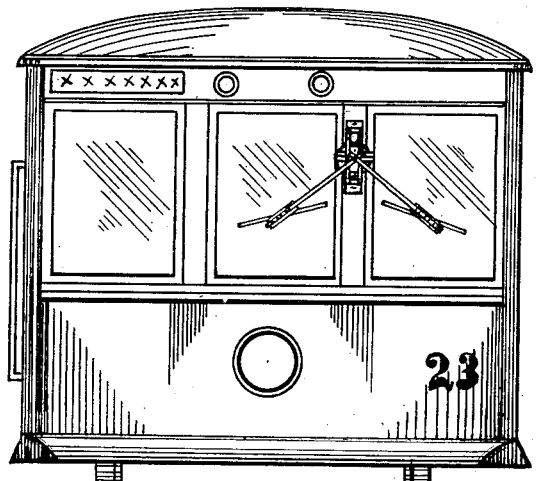
Figure 1 is a transverse view of a street car, a device illustrative of the invention being mounted thereon.

Following the drawing in detail, the numeral 1 designates the frame having disposed centrally thereof the slot 2; said frame 1 having laterally extending arms 3 at either side thereof forming a cross. A portion of the bar 4 fits within the slot 2 and is adapted to slide therein. Extending outwardly of the block 4 is the pin 5.

Figures 2, 3:
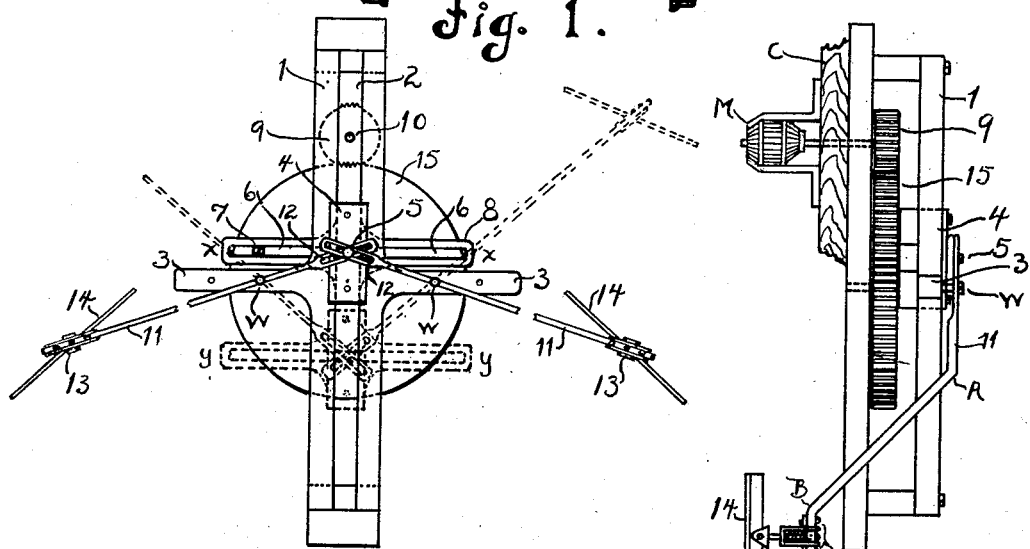
Figure 2 is a front elevation view of the device.
Figure 3 is a side view thereof.
Figure 4:
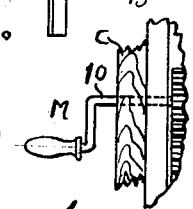
Figure 4 is a detail sectional view, showing a crank in lieu of a motor, as a power source.
Figure 5:
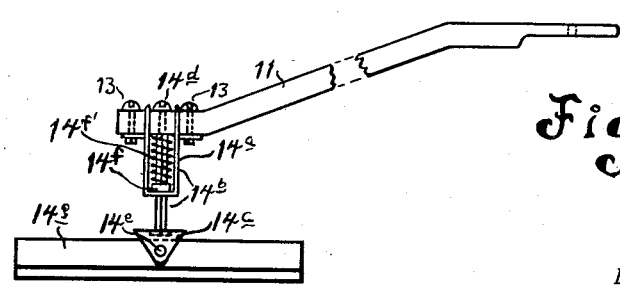
Figure 5 is a detail side view of the wiper arm and wiper support.

A disk 15 is mounted centrally of the frame 1. The slideable bar 4 extends through the slot 2 in the frame 1, to the inner side of the frame 1, the bar 4 having on its outer side flanges which extend beyond the groove 2 and partially over the frame 1 as shown in Figure 2 of the drawing. The pin 5 is permanently disposed in a central lateral position through the bar 4, as shown in Figure 2, the outer end of the pin 5 engaging with the slots 12 in the arms 11; the inner extenuation of the bar 4 is in permanent engagement with the cross bar 8, thus when the bar 4 slides upward or downward within the slot 2, so likewise does the bar 8 rise or fall. The bar 8 has extending centrally and the entire length thereof, a slot 6 as shown in Figure 2 of the drawing. A pin 7 is disposed in the face of the disk 15 and extends thru the slot 6. Thus, on revolution of the disk 15, the pin 7 sliding within the slot 6 of the bar 8, will cause the bar 4 to go up or down in the slot 2 of the frame 1.

A gear 9 rotatably mounted on the shaft 10, is in mesh with the teeth on the disk 15. The shaft 10 extends thru the frame support C to connect with the motor M.

Wiper arms 11 are pivoted at W on the lateral arms 3. The inner ends of the arms 11 are slotted at 12, the pin 5 in the bar 4 extending thru the slots 12, as shown in Figures 2 and 3. At the outer extremities of the arms 11 are attached U-shaped sockets 14a, retained in a predetermined position on the arms 11 by the bolts 13. The bolt-arm 14b extends thru a hole in the arm 11 and a hole in the U-shaped socket 14a, to support the U-shaped swivel support 14c, the head of the bolt-arm 14b being affixed to the base of the U-shaped swivel support 14c, the U-shaped swivel support 14c therefore turning with the revolution of the bolt arm 14b. Pivoted on the U-shaped swivel support 14c at 14e is the wiper 14g. The bolt-arm 14b is threaded and has disposed thereon an adjustable nut 14f, which is held in position by the sides of the U-shaped socket 14a. At the outer extremity of the bolt-arm 14b is a screw-head 14d; and a spring 14f' is disposed within the U-shaped socket 14a and about the bolt arm 14b and adapted to exert a constant pressure against the nut 14f.

The wiper arms 11 are bent inwardly at A and outwardly at B, as shown in Figure 3, the purpose thereof being that the wiper mechanism is mounted outwardly of the supporting structure, and principally for the reason that the windows on street cars are at angles to the supporting structure C.

The device described being put into operation, and the bar 4 sliding up and down within the slot 2, as previously described, the wiper arms 11, pivoted at W, sweep from the lowered position shown in Figure 2 to the position of the dotted lines shown, the bar 8, on revolution of the disk 15, traveling to the dotted position y—y.

Due to the fact, that a wiper device of this general character has a surface to cover which is angular in position to the supporting frame of the device, it is necessary that the wiper 14g has great flexibility with regard to its relation on the arm 11. For this reason it is pivoted at 14e, and is supported by an adjustable arm 14b, as previously described, this assemblage permitting the greatest flexation of the members.

The construction, operation and advantages of my invention will, it is believed, be understood and appreciated by those skilled in the art when the foregoing description has been read in connection with the accompanying drawing. The degree of adjustment of the several members in relation to each other is such as to take care of any requirements; and, while I have here shown and described and pointed out certain novel features of my invention, it is to be understood that various omissions, substitutions and changes in the form and details of the device and its means of operation may be made by those skilled in the art, and that I do not wish to be restricted to the precise structure disclosed, but hold myself entitled to make such changes therefore as fairly fall within the scope of what I claim.

What I claim is:

A windshield cleaning apparatus comprising a supporting frame, a disc rotatably mounted on an axis in permanent relationship with said frame and responsive to motivating impulse, a pin disposed at a fixed point on the outer periphery of said disc, a support element slidably mounted on the supporting frame and having a lateral arm with a slot therein, the pin on the periphery of the disc extending thru the slot in said lateral arm and adapted to slide thru said slot on revolution of the disc, and wiper arms pivoted at fixed points at each side of the supporting element and being connected with the supporting element by a pin carried by the supporting element and extending thru slots in the adjacent ends of the wiper arms, and a wiper element carried by the outer end of each arm.

CORRAY U. PARKER.